Sept. 8, 1959  F. J. B. BERRY  2,903,132
APPARATUS FOR SORTING SOLID PRODUCTS BY DENSITY
Filed May 7, 1956  2 Sheets-Sheet 1

INVENTOR
FRANCOIS JACQUES BARTHELEMY BERRY, DECEASED,
BY PAUL BERRY, EXECUTOR

By Young, Emery & Thompson
ATTYS.

Sept. 8, 1959 F. J. B. BERRY 2,903,132
APPARATUS FOR SORTING SOLID PRODUCTS BY DENSITY
Filed May 7, 1956 2 Sheets-Sheet 2

INVENTOR
FRANCOIS JACQUES BARTHELEMY BERRY, DECEASED,
BY PAUL BERRY, EXECUTOR
By Young, Emery & Thompson
ATTYS.

United States Patent Office 2,903,132
Patented Sept. 8, 1959

2,903,132

APPARATUS FOR SORTING SOLID PRODUCTS BY DENSITY

Francois Jacques Barthelemy Berry, deceased, late of Lille, France, by Paul Berry, executor, Lille, France Application May 7, 1956, Serial No. 583,292

Claims priority, application France May 7, 1955

1 Claim. (Cl. 209—44)

The present invention relates to an apparatus for sorting solid products by density, of the type comprising a table through which passes an intermittent upward current of air.

The object of the invention is an apparatus of the above kind which ensures a particularly effective separation of the products and is of simple construction.

In accordance with the invention, the table is provided with wide passages through which pass the heaviest products. During the travel of the products along the table, the heavier products are progressively eliminated, whilst the light products are collected at the end of the table. The travel of the products is preferably arranged to be in one direction only, and the wide holes which are closest to the feed side of the table are sufficiently distant from the feeding extremity to enable a first decantation of the products to be effected.

In accordance with a further feature of the invention, the wind box located underneath the table is divided into compartments by means of partitions with individual regulation of the air in each compartment, whilst perforated barriers are provided on the table immediately above the said partitions with the object of assisting the decantation.

Further special features and advantages of the invention will also be brought out in the description which follows below of forms of embodiment chosen by way of example, reference being made to the accompanying drawings, in which.

Figure 1:
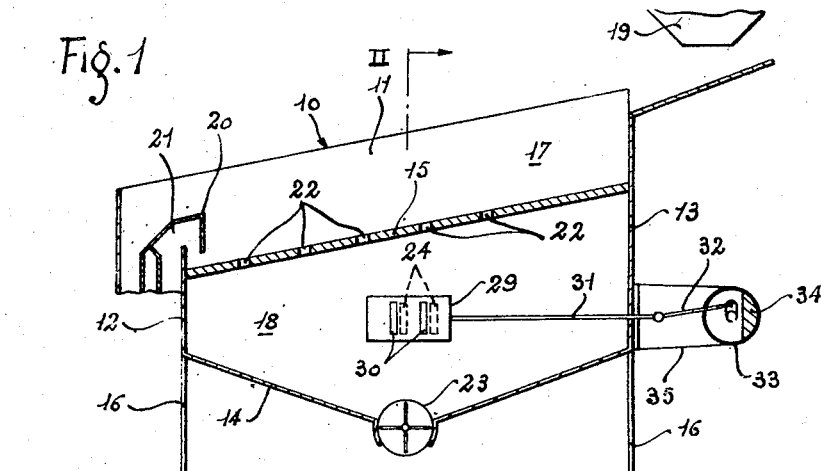
Fig. 1 is a view in longitudinal cross-section taken along the line I—I of Fig. 2.
Figure 2:
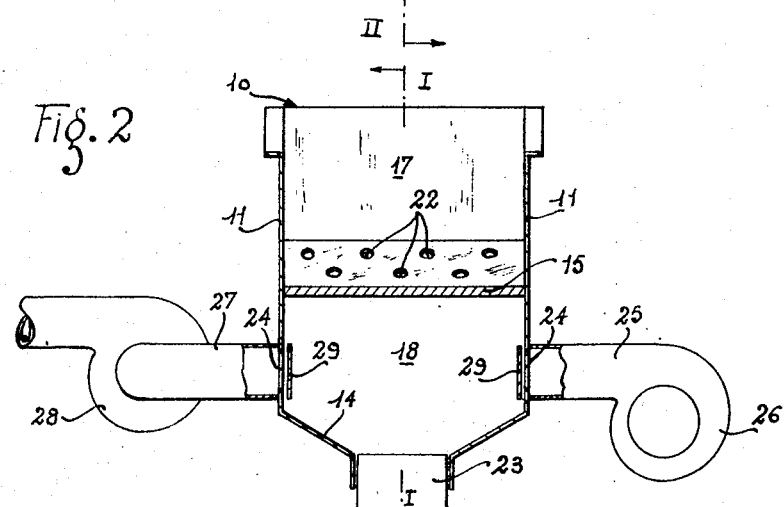
Fig. 2 is a view of the apparatus in transverse cross-section, following the line II—II of Fig. 1.

Reference will first of all be made to Figs. 1 and 2, in which is shown a method of construction of an apparatus in accordance with the invention. This apparatus comprises a box-shaped structure or caisson 10 formed by two parallel vertical side walls 11, a front wall 12, a rear wall 13, a bottom 14 in the form of a hopper and an intermediate plate 15 inclined towards the base and towards the front. In an alternative construction, the plate 15 may be horizontal.

The whole unit comprising this caisson 10 is supported above the ground by flexible strips 16 which allow the caisson to oscillate longitudinally from the front towards the rear and vice-versa. The space 17 of the caisson which is located above the plate 15 forms a sorting table along which travel the products to be sorted, whilst the space 18 of the caisson which is located below the plate 15 forms an air-tight box.

At the rear extremity of the table 17 is arranged a feeder device 19 for the raw products to be sorted, whilst at the front extremity of the table 17 there are provided on the one hand an overflow sill 20 and a siphon 21 which forms a submerged weir. The sill 20 is spaced above the plate 15, whilst the intake of the siphon 21 is adjacent to the plate 15.

The plate 15 is finely perforated over the whole of its surface so that a current of air may be passed through it. This plate may consist for example of a steel sheet perforated with holes or of a grating, or it may be formed of a porous material. In addition, holes 22 of larger diameter are formed here and there in the plate 15 so as to allow the passage through them of the coarser products during the sorting process. The holes 22 may be distributed in any appropriate manner over the plate 15, but those which are nearest to the rear extremity of the apparatus are provided at a sufficient distance from that extremity to prevent the products passing through them prematurely, as will become apparent later.

At the bottom of the hopper 14 of the wind box 18 is located a device 23 for evacuating the products which, after having passed through the holes 22, are collected in this hopper. This device may be of any appropriate type, and may consist for example of a rotary lock device of the kind shown in the drawings.

In the side walls 11 of the box 18 are formed rows of ports 24. The ports 24 of one of the walls 11 communicate with the delivery conduit 25 of an external fan 26, whilst the ports 24 of the other wall 11 communicate with the suction conduit 27 of a further external fan 28. Against each row of ports 24 is arranged to move a mask 29 which is provided with openings 30 and forms a kind of slide-valve along the corresponding wall 11. The two slide-valves 29 are coupled by rods 31 to a crank-rod 32 of an out-of-balance eccentric device 33, 34. The eccentric 33 is rotatably mounted on a support 35 fixed to the caisson 10 and is driven in rotation by any suitable means. The setting of the slide-valves is so arranged that, when the ports 24 of one of the walls 11 are closed by the slide, the ports 24 of the other wall 11 are open. The out-of-balance weight 34 imparts an oscillating motion to the caisson 10 by virtue of the flexible supports 16. This movement is synchronised with the opening and closing of the ports 24. The out-of-balance weight 34 is mounted on the eccentric 33 in such manner that the table is displaced towards the front when the space 18 is connected to the suction fan 28 and is cut-off from the delivery fan 26, and moves backward when the space 18 is connected to the delivery fan 26, and is cut-off from the suction fan 28.

In operation, the raw products to be sorted are discharged from the feeder device 19 at the rear extremity of the table 17. Under the action of the alternate pressures and suctions produced by the slide-valves 29 and the fans 26 and 28 in the space 18, the layer of products is subjected to an intermittent fluidisation at the frequency of the oscillations of the table, which ensures a classification by density of the raw products.

When the raw products reach the first holes 22, the heaviest products have already come into contact with the plate 15 and it is these only which are permitted to pass through the holes 22 up to a point near the front of the apparatus. The heavy products are thus collected in the hopper 14 and are delivered by the rotary lock device 23. The less heavy products which progress towards the front of the table at the same time as the heavier products but above the latter, are discharged, in the case of the lightest products over the sill 20 and, in the case of products of average density or mixed, through the siphon 21.

The heavy products are thus collected at 23, the mixed at 21 and the light products at 20.

With a view to obtaining the optimum conditions of operation in each particular case, regulating means are provided in accordance with the invention. These means may consist of a variation of the rate of feed to the table of raw products, for example, by regulation of the feeder device 19. It is also possible to act on the speed of travel of the products along the table by regulation of the slope of the plate 15 and/or by varying the amplitude of the oscillations of the table. The pressure and the rate of flow of the air at the delivery and/or at the suction may also be varied. These various means can be adopted separately or in combination.

Figure 3:
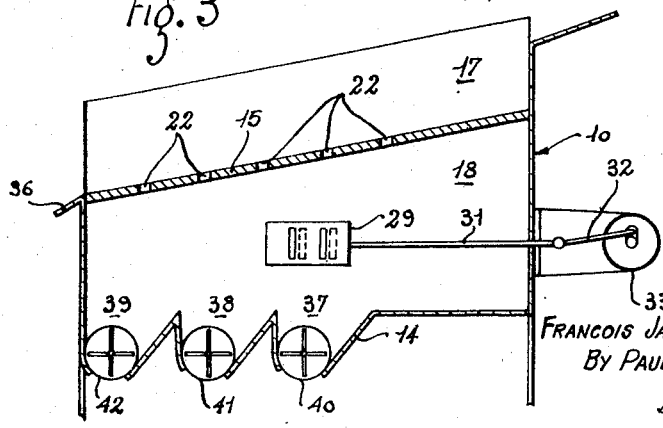
Fig. 3 is a view similar to that shown in Fig. 1, but relating to an alternative form of construction.

In the alternative form of construction shown in Fig. 3, the arrangement is similar to that which has just been described with reference to Figs. 1 and 2, and the same reference numbers have been used to designate similar members. However, in the alternative form of Fig. 3, the caisson is not subjected to oscillations but is made stationary, whilst the sills 20 and 21 are dispensed with and are replaced by an extension 36 of the plate 15. The hopper 14 is provided with a number of compartments 37, 38, 39 in stages along the caisson and provided respectively with rotary lock devices 40, 41 and 42 or the like.

The operation is similar to that which has already been described. The heavy products pass through the holes 22. The heaviest products, which are the first to pass, are collected in the compartment 37, the medium heavy products pass into the compartment 38, and the less heavy into the compartment 39, and it is the lightest products which are delivered at 36. The light products are thus collected at 36, the medium-light products at 39, the medium-heavy at 38, and the heavy at 37.

Figure 4:
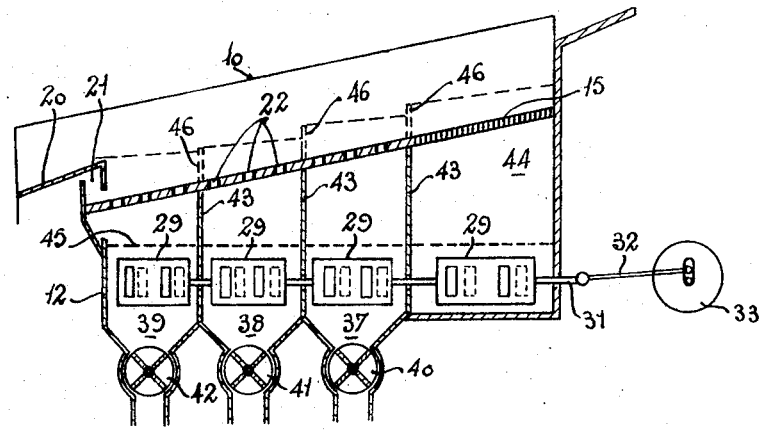
Fig. 4 is a still further view similar to that of Fig. 1, but relates to a further alternative form.
Figure 5:
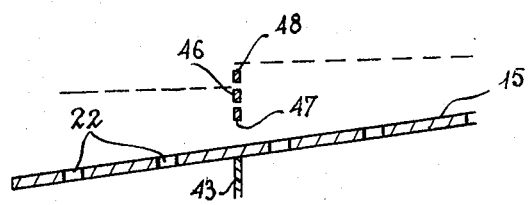
Figs. 5 and 6 are views to a larger scale of details of Fig. 4.

In the further alternative form shown in Figs. 4 to 6, the arrangement is again similar to that which has been described with reference to Figs. 1 and 2, or with reference to Fig. 3. In Fig. 4, there will again be seen at 37, 38 and 39, the compartments of the hopper 14 spaced along the caisson and provided respectively with rotary lock devices or the like 40, 41 and 42. But in this case the compartments are isolated from each other by transverse partitions 43 which extend to the plate 15. In addition, there will be seen at 44 a compartment located to the rear of the apparatus and not provided with any lock device.

The part of the base 15 which covers the compartments 37, 38 and 39 is provided with openings or perforations 22 in close and regular formation and adapted to ensure a uniform distribution of the air whilst permitting the heaviest products to pass towards the lock devices 40, 41 and 42. This portion of the plate 15 may consist of a perforated steel sheet or of a screen with a wide mesh. On the other hand, the part of the base 15 which is located above the compartment 44 is provided with very much smaller perforations, or consists of a screen with a much closer mesh, or any other suitable arrangement such that the products are retained but the air is allowed to pass. Each compartment 37, 38, 39 and 44 is provided with a separate slide-valve device 29, and all these devices are operated by the same rod 31. The flow of air may thus have an appropriately different regulation from one compartment to the other. A distribution plate 45 is provided between the base 15 and the lock devices so as to provide a regular supply to the lock device in each compartment.

Each partition 43 is extended (see Figs. 4 and 5) above the base 15 by a transverse barrier 46. Each barrier 46 is formed by one or a number of strips of screen, wire mesh, or perforated sheet with holes slightly larger than the products to be treated. The barrier is directed vertically, with its lower edge 47 spaced away from the base 15 by a distance greater than the diameter of the largest pieces of the products, whilst its upper edge 48 is arranged to be submerged in the thickness of the products on the base 15.

Figure 6:
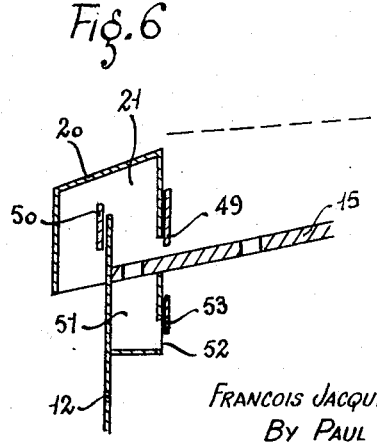

The evacuation device 20—21 (see Fig. 4), located at the front of the table 10, is similar to that of Fig. 1 but comprises in addition various means of regulation, as can be more particularly seen in Fig. 6. In accordance with these means, a flow-regulator 49 is arranged at the intake of the siphon 21, whilst the weir 50 inside this siphon 21 can be regulated in height. A casing 51 is provided in addition below the base 15, directly under the rising member of the siphon 21, and is provided with a passage 52 which communicates with the compartment 39. This passage 52 comprises a flow-regulator 53 which enables the flow of air inside the siphon 21 to be regulated at will.

The whole of the table 10 is preferably subjected to a periodic motion following a trajectory inclined to the horizontal, with a view to facilitating the travel of the products whilst permitting of a slight slope of the base 15.

What is claimed is:

An apparatus for sorting solid products by density, comprising a table along which travel the solid products to be sorted, said table being pervious to air but not to the said products, means for passing an intermittent current of air upwards through the table, said table comprising two successive zones with the heavy products passages formed in the second zone only and barrier means between said two zones above said table.

References Cited in the file of this patent

UNITED STATES PATENTS 2,449,582    Brusset _____ Sept. 21, 1948

FOREIGN PATENTS 798,731    France _____ Mar. 11, 1936
808,429    France _____ Nov. 14, 1936
447,229    Great Britain _____ May 14, 1936